(12) United States Patent
Sato (10) Patent No.: US 6,473,201 B1
(45) Date of Patent: Oct. 29, 2002

(54) METHOD AND APPARATUS FOR ANALYZING AND CONVERTING BI-LEVEL IMAGE DATA

(75) Inventor: Junji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/274,113

(22) Filed: Mar. 23, 1999

(30) Foreign Application Priority Data

Mar. 27, 1998 (JP) .......................................... 10-100166

(51) Int. Cl.[7] .............................................. G06F 15/20
(52) U.S. Cl. ......................... 358/1.9; 382/232; 382/243
(58) Field of Search ........... 358/1.9, 426, 261.1–261.4, 358/3.2; 382/232–236, 244–247, 243

(56) References Cited

U.S. PATENT DOCUMENTS

T985,005 I4 * 8/1979 Goertzel et al. .............. 341/63
4,486,784 A * 12/1984 Abraham et al. ............. 341/63
4,543,612 A * 9/1985 Matsunaga et al. ......... 341/106
4,968,135 A * 11/1990 Wallace et al. ........... 358/261.1
5,319,463 A * 6/1994 Hongu et al. ............. 358/261.1

* cited by examiner

*Primary Examiner*—Thomas D. Lee
*Assistant Examiner*—Stephen Brinich
(74) *Attorney, Agent, or Firm*—Rabin & Berdo, P.C.

(57) ABSTRACT

A bi-level image, coded as transition data indicating positions of transitions in individual dot lines, is analyzed by comparing transition positions occurring in a consecutive group of dot lines, and detecting segments in different dot lines in the group that have the same level and join up in the direction parallel to the dot lines. The line density of the bi-level image can be reduced by replacing the group of dot lines with a single new dot line that includes the transition positions of all dot lines in the group, except for interior transition positions of joining segments. The line density can be increased by copying transition data of each dot line to a new dot line, adjusting the transition positions of segments that join segments in an adjacent dot line.

11 Claims, 12 Drawing Sheets

| LINE | INPUT | OUTPUT |
|------|-------|--------|
| #0   | 4, 6, EOL | 2, 8, EOL |
| #1   | 2, 4, 6, 8, EOL | 1, 2, 8, 9, EOL |
| #2   | 1, 2, 8, 9, EOL | 7, 9, EOL |
| #3   | 8, 9, EOL | 3, 7, EOL |
| #4   | 8, 9, EOL | 1, 3, EOL |
| #5   | 7, 8, EOL | 1, 9, EOL |
| #6   | 5, 7, EOL | |
| #7   | 3, 5, EOL | |
| #8   | 2, 3, EOL | |
| #9   | 1, 2, EOL | |
| #10  | 1, 9, EOL | |
| #11  | EOL | |

| LINE | INPUT | OUTPUT |
|---|---|---|
| #0 | 3, 7, EOL | 3, 7, EOL |
| #1 | 1, 3, 7, 9, EOL | 2, 8, EOL |
| #2 | 7, 9, EOL | 1, 3, 7, 9, EOL |
| #3 | 3, 7, EOL | 1, 3, 7, 9, EOL |
| #4 | 2, 3, EOL | 7, 9, EOL |
| #5 | 1, 9, EOL | 7, 8, EOL |
| #6 | | 3, 7, EOL |
| #7 | | 2, 7, EOL |
| #8 | | 2, 3, EOL |
| #9 | | 1, 3, EOL |
| #10 | | 1, 9, EOL |
| #11 | | 1, 9, EOL |

METHOD AND APPARATUS FOR ANALYZING AND CONVERTING BI-LEVEL IMAGE DATA

BACKGROUND OF THE INVENTION

The present invention relates to a method of analyzing and converting bi-level image data, applicable to, for example, line-density conversion in a facsimile machine.

Devices that transfer and store image data sometimes convert the line density of the data. For example, image data having a density of six hundred dot-lines per inch (600 dpi) are sometimes reduced to three hundred dot-lines per inch (300 dpi), and 300-dpi image data are sometimes converted to 600-dpi data. The former process compresses the amount of data, while the latter process expands the data. These processes are carried out in facsimile transmissions between facsimile machines that print and scan with different line densities, for example.

A simple method of reducing the line density of an input image is to discard every second line. Another method generates a single new dot line by performing bit-wise logical OR operations on the bit-mapped dot data of pairs of adjacent dot lines in the image. A simple method of increasing the line density copies each dot line of the input image to two dot lines in the output image. Another method generates interpolated dot lines by performing bit-wise comparisons on pairs of adjacent bit-mapped dot lines.

The processes that simply copy and discard dot lines can be carried out at high speed, but they lead to image defects, such as jagged contours, and discontinuities in nearly horizontal fine lines. Bit-wise logical operations and comparisons can prevent these image defects, but these operations take time. In facsimile transmissions, for example, they can limit the transmission speed.

There is thus a need for a line-density conversion method that is fast, but does not leave image defects. There is also a general need for high-speed methods of analyzing bi-level images for such purposes as removal of dot noise and smoothing of contours.

SUMMARY OF THE INVENTION

One object of the present invention is to provide a high-speed method of analyzing a bi-level image.

Another object is to provide a high-speed method of generating new dot lines from existing dot lines in a bi-level image, achieving results equivalent to the results achieved by bit-wise logical operations and comparisons.

In the invented method of analyzing a bi-level image, the image is coded as transition data indicating positions of transitions between a first level and a second level in individual dot lines oriented in a first direction. The method comprises the steps of:

(a) reading transition positions occurring in a consecutive group of dot lines;

(b) comparing the transition positions in different dot lines in the group; and (c) detecting segments in different dot lines in the group that have the first level, and are mutually joined in the first direction.

The invention also provides a method of generating transition data for a new dot line by using steps (a), (b), and (c) to analyze the image. This method copies the transition data read in step (a), omitting interior transition positions of the mutually joined segments detected in step (c). In addition, the invention provides an image-processing apparatus that reduces the line density of a bi-level image by generating a new dot line in this way from a pair of adjacent dot lines in the bi-level image.

The invention furthermore provides a method and apparatus for interpolating a new dot line between a first dot line and a second dot line in a bi-level image, by using steps (a), (b), and (c) to detect segments in the first dot line that join with segments in the second dot line. For each such segment detected in the first dot line, a first joining segment and a last joining segment are detected in the second dot line. Transition data for the interpolated dot line are created by copying the transition data of the first dot line, adjusting the transition positions of segments detected in step (c) in the first dot line according to the transition positions of the first and last joining segments in the second dot line.

The invented method of analyzing a bi-level image can also be used for dot-noise removal and contour smoothing.

The invented methods are fast because they operate on transition data, instead of bit-mapped image data.

DETAILED DESCRIPTION OF THE INVENTION

Embodiments of the invention will be described with reference to the attached drawings.

Figure 1:
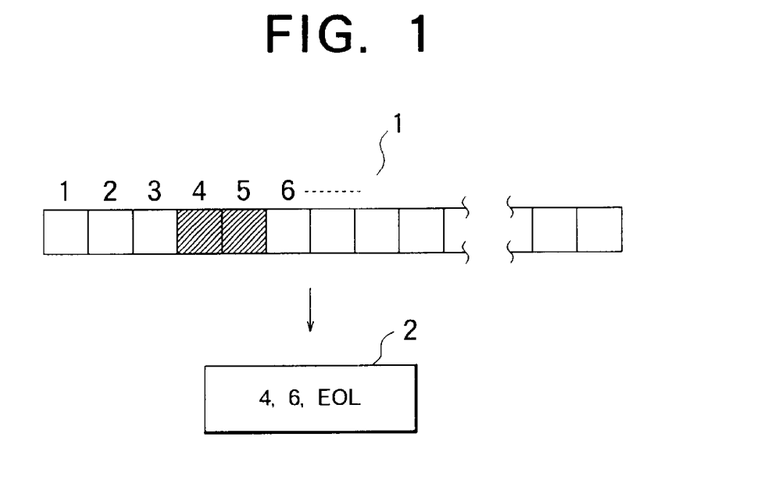
FIG. 1 illustrates a method of encoding a dot line in a bi-level image.

FIG. 1 illustrates a method of coding bi-level image data employed in the present invention. In this method, a dot line 1 is coded as data 2 giving the position of the first black dot, the position of each subsequent transition from black to white or white to black, and an end-of-line code (EOL). The illustrated line, in which only the fourth and fifth dots are black, is thus coded as shown (4, 6, EOL). In the description below, the position of the first black dot will be referred to as a transition position even if the first black dot is the first dot in the line, and the coded data 2 will be referred to as transition data.

Facsimile data are coded in essentially this way, by coding the transition positions. Actual facsimile coding schemes are more complex, compressing the data both horizontally and vertically, but facsimile data can easily be converted to the coded form shown in FIG. 1.

Figure 2:
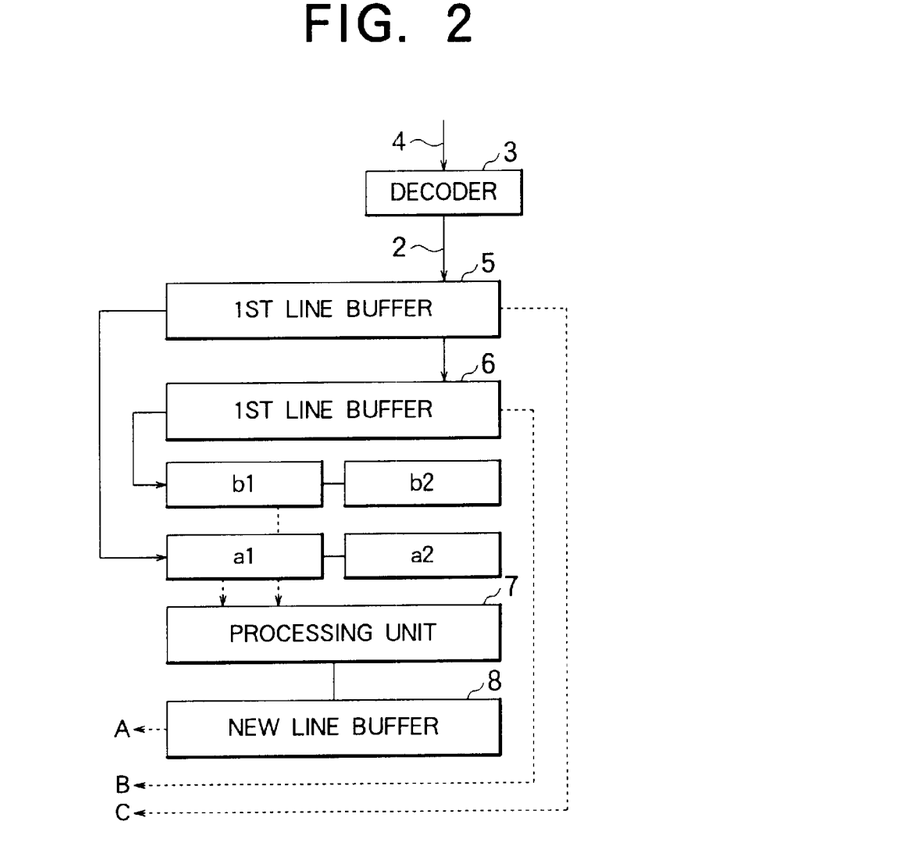
FIG. 2 is a block diagram of an image-processing apparatus with which the invention may be practiced.

Referring to FIG. 2, the invented image-processing apparatus has a decoder 3 that receives data 4 coded according to, for example, a facsimile coding scheme, and converts the data to transition data 2 coded in the form shown in FIG. 1. The apparatus also has a pair of line buffers 5, 6 that store two consecutive coded dot lines. A processing unit 7 reads a pair of transition positions a1, a2 from the first line buffer 5, which stores the transition data of the current dot line, and a pair of transition positions b1, b2 from the second line buffer 6, which stores the transition data of the preceding dot line. By comparing such pairs of transition positions, the processing unit 7 generates transition data describing a new dot line, and stores the data in a new line buffer 8.

The apparatus in FIG. 2 is suitable for halving or doubling the line density of bi-level image data. When the line density is halved, one new dot line is output for every two input dot lines. When the line density is doubled, one new dot line is output for every input dot line, the new line generated from the current input dot line and the preceding input dot line being interpolated between those two dot lines. Thus, output A is used for reducing the line density by a factor of two, and outputs A and B, or A and C, are used when the line density is increased by a factor of two.

The apparatus in FIG. 2 can also be used for such image-processing purposes as dot-noise removal and contour smoothing.

Figure 3:
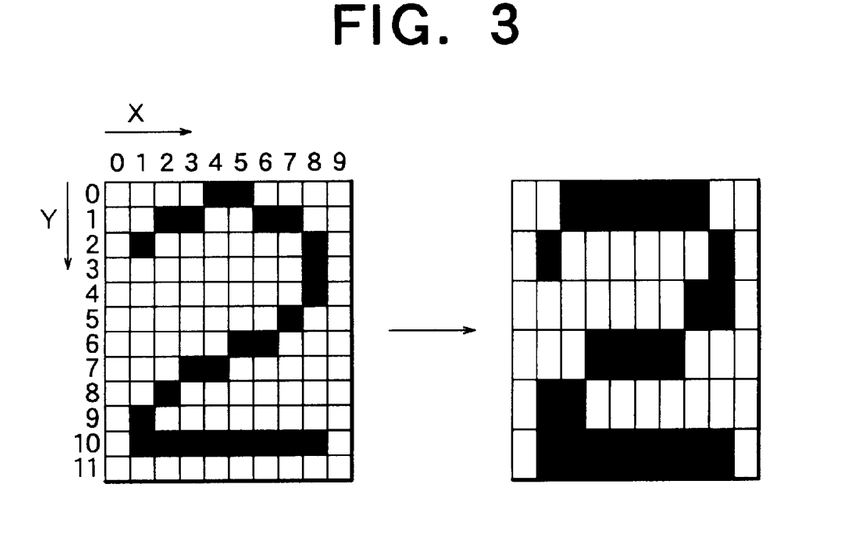
FIG. 3 shows input and output images illustrating line-density conversion in a first embodiment of the invention.

As a first embodiment of the invention, a method of reducing the line density of a bi-level image by a factor of two will be described below. FIG. 3 shows an example of a bi-level image of the character '2' before and after the line-density conversion. The X-direction is the dot-line direction, sometimes referred to as the main scanning direction. The Y-direction is the perpendicular direction, also referred to as the sub-scanning direction. The first embodiment combines pairs of adjacent dot lines by OR logic.

Figure 4:
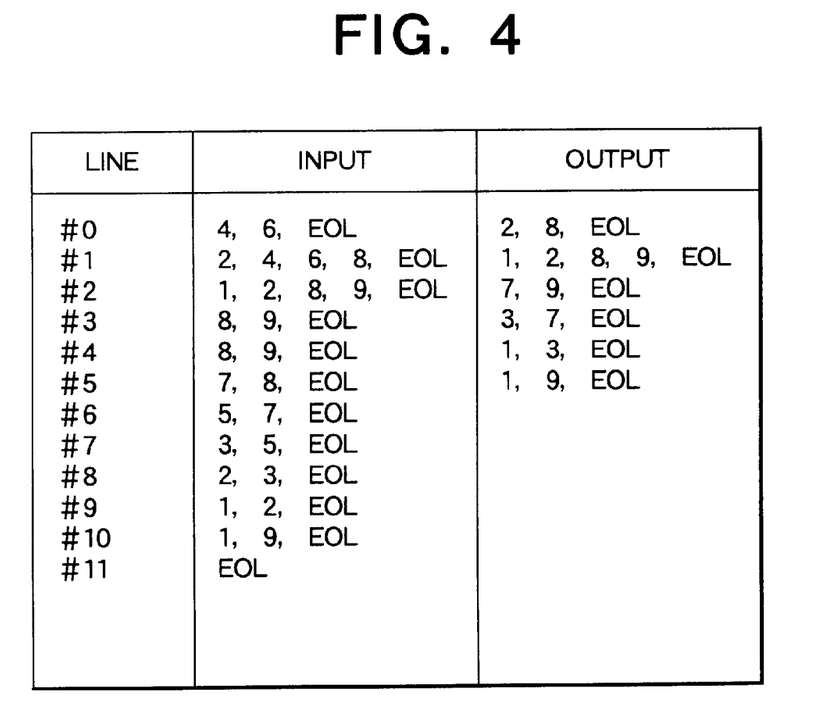
FIG. 4 shows the transition data of the images in FIG. 3.

FIG. 4 lists the transition data of the input image and the output image. Output line #0 is obtained from input lines #0 and #1, output line #1 from input lines #2 and #3, output line #2 from input lines #4 and #5, and so on.

FIGS. 5 to 9 illustrate the method by which the converted transition data are obtained. In these drawings, a1 and a2 represent a consecutive pair of transitions in an input line #N, a1 being a transition to black and a2 a transition to white. Thus the line segment from position a1 to position a2 (including position a1 but not position a2) is black. Similarly, b1 and b2 are a consecutive pair of transitions in the preceding input line, the segment from position b1 to position b2 being black. Position a0 is the position of the last black-to-white transition occurring before both b1 and a1. Position a0 could occur in either line, but is shown as occurring in line #N. The new line is obtained by combining the two input lines, and includes a0 as a black-to-white transition position.

For clarity, a0, a1, b1, a2, and b2 are represented by positions in FIGS. 5 to 8, but in the actual transition data, a0, a1, a2, b1, and b2 are numerical values, as in FIG. 4.

Figure 5:
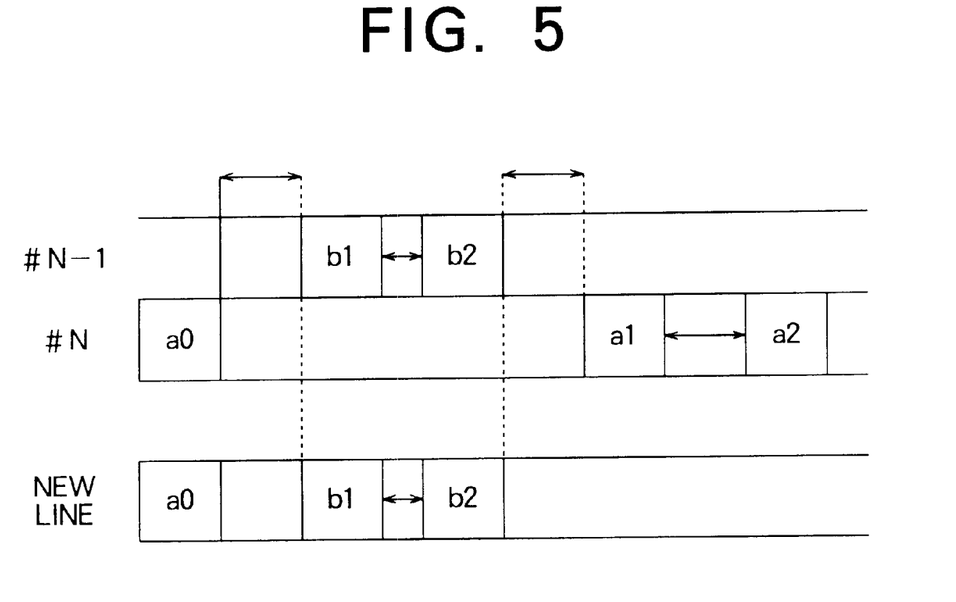
FIGS. 5 and 6 illustrate the processing of horizontally isolated segments in the first embodiment.

In FIG. 5, the black segment from b1 to b2 precedes the black segment from a1 to a2, and the two black segments are separated horizontally (b2<a1), as indicated by the dotted lines. The black segment from b1 to b2 is also separated from the black segment that ended at position a0 in line #N (because a0<b1). The next segment output in the new line must therefore match the segment from b1 to b2, as indicated.

Incidentally, the black segment from b1 to b2 would be separated from the black segment from a1 to a2 even if the dotted lines between them coincided (a1=b2+1), because the dot at position b2 is white.

Figure 6:
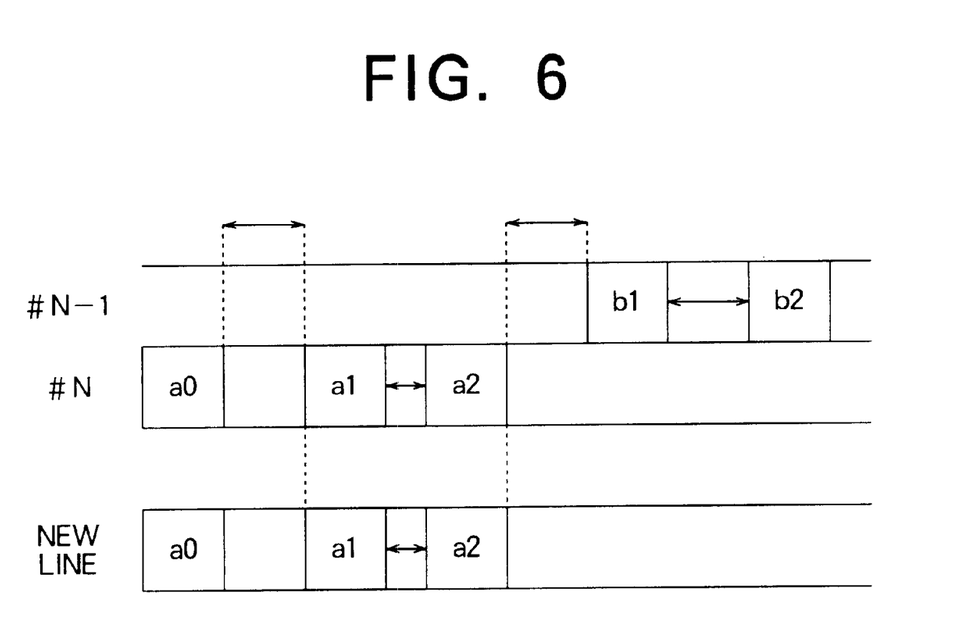

In FIG. 6, the black segment from a1 to a2 precedes the black segment from b1 to b2, and the two black segments are again separated horizontally (a2<b1). The next segment output in the new line matches the segment from a1 to a2, as indicated.

Figure 7:
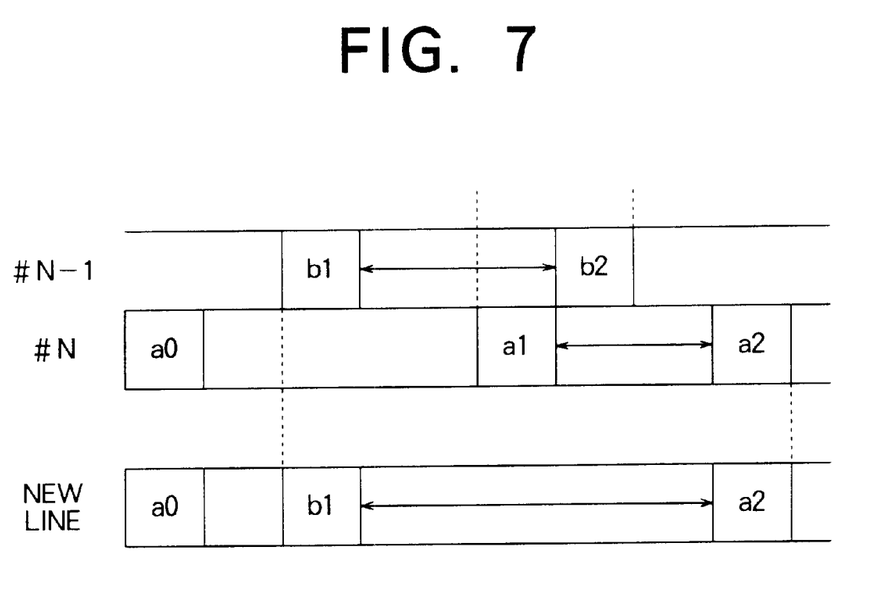
FIGS. 7 and 8 illustrate the processing of horizontally joined segments in the first embodiment.

In FIG. 7, the black segment from a1 to a2 joins up horizontally with the black segment from b1 to b2. This means that if the two segments were to be placed in the same horizontal line, there would be no gap between them. In the present example, not only is there no gap; the two segments overlap. The next black segment output in the new line extends from position b1 to position a2. The transition data for this new segment include the outer transition positions b1 and a2, but exclude the interior transition positions a1 and b2.

Figure 8:
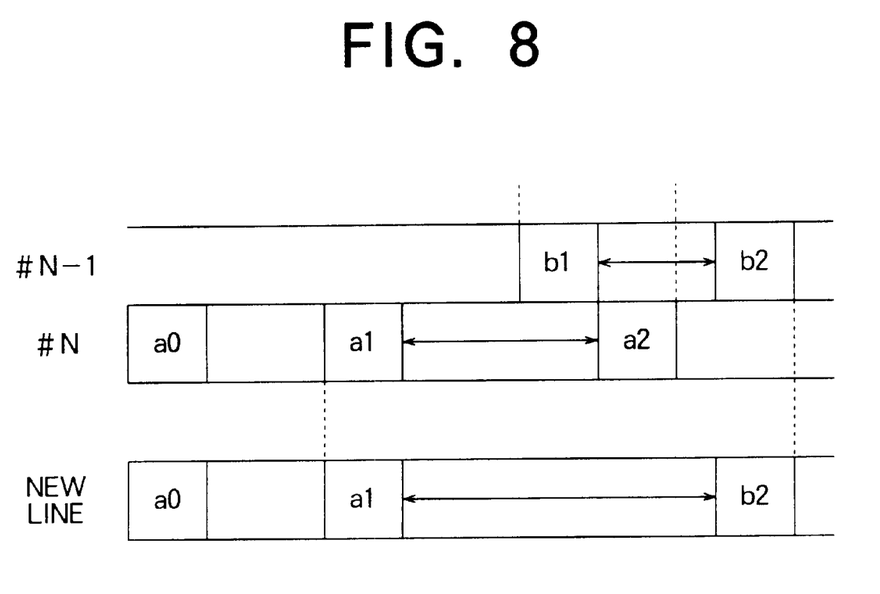

In FIG. 8, the black segment from a1 to a2 again joins up horizontally with the black segment from b1 to b2. The next black segment output in the new line extends from position a1 to position b2. The transition data for this new segment include the outer transition positions a1 and b2, but exclude the interior transition positions b1 and a2.

Figure 9:
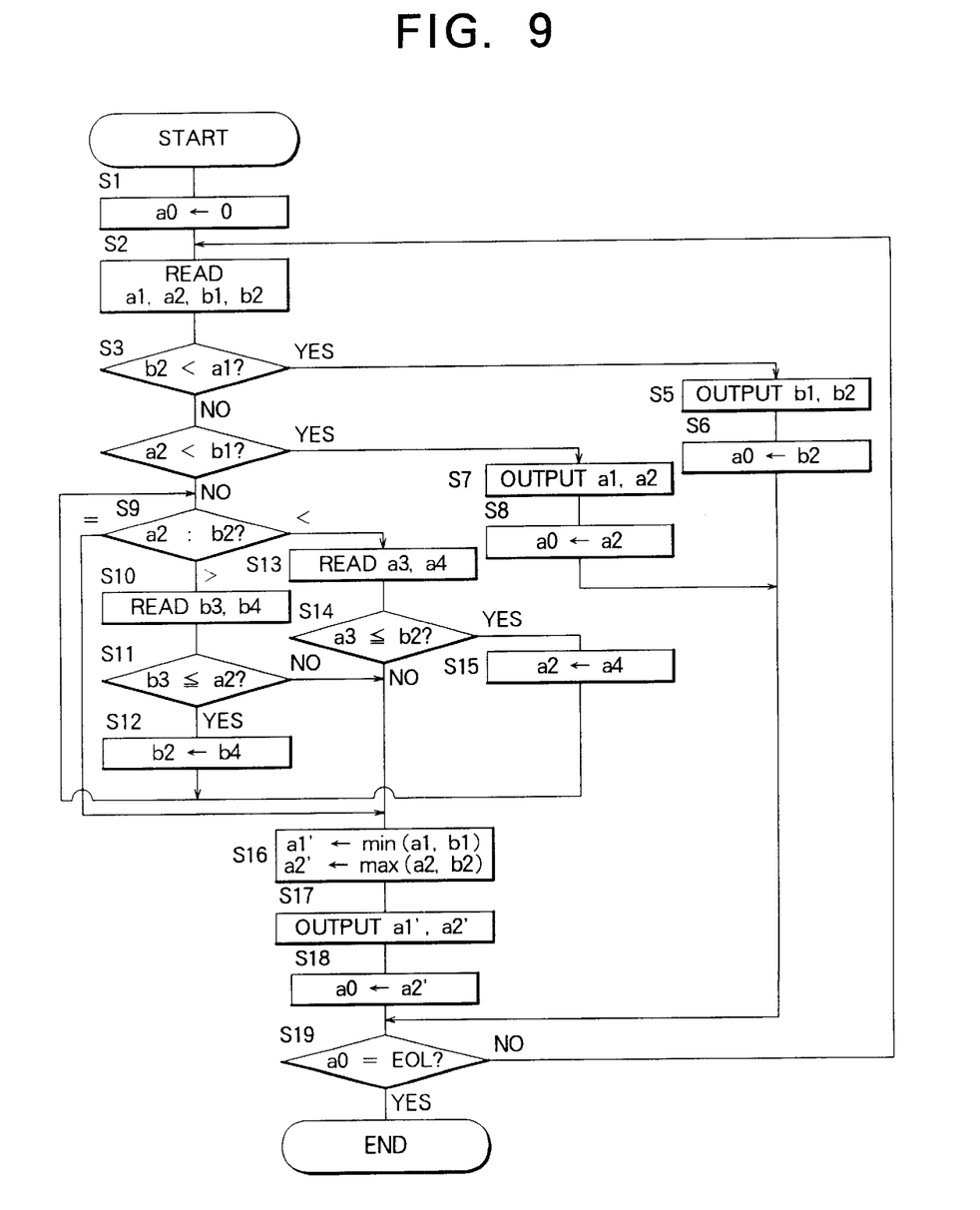
FIG. 9 is a flowchart illustrating the operation of the first embodiment.

FIG. 9 illustrates the process by which the processing unit 7 generates the new line. Position a0 is the last black-to-white transition output so far in the new line, a1 and a2 are the first pair of transitions following position a0 in the current input line, while b1 and b2 are the first pair of transitions following position a0 in the preceding input line.

When the process starts, a0 is initialized to zero, because no transitions have been output yet (step S1). The processing unit 7 reads the next pair of transitions a1, a2 from the current line and the next pair of transitions b1, b2 from the preceding line (step S2). The first time this step is performed, a1 and a2 are the first pair of transitions in the current line, and b1 and b2 are the first pair of transitions in the preceding line. Transitions a1 and b1 are always white-to-black transitions.

In reading transitions from the line buffers, the processing unit 7 will sometimes encounter an end-of-line code. The end-of-line code is treated as a numerical value greater than the rightmost dot position in a line. If an end-of-line code is read for a1 (or b1), then the end-of-line code value is also assigned to a2 (or b2).

The processing unit 7 compares a1 with b2 (step S3), and b1 with a2 (step S4). If b2 precedes (is less than) a1, the processing unit 7 outputs b1 and b2 as a pair of transitions in the new line (step S5), and updates a0 by assigning the value of b2 (step S6). If a2 precedes b1, the processing unit 7 outputs a1 and a2 as a pair of transitions in the new line (step S7), and updates a0 by assigning the value of a2 (step S8). These steps cover the cases in which segments a1-a2 and b1-b2 are mutually isolated.

If segments a1-a2 and b1-b2 are not mutually isolated, that is, if they join horizontally, the processing unit 7 compares a2 and b2 (step S9).

If a2 follows (is greater than) b2, the processing unit 7 reads the next pair of transitions b3, b4 from the preceding line (step S10), and compares b3 with a2 (step S11). If b3 does not follow (is equal to or less than) a2, indicating that segment a1-a2 also joins horizontally with segment b3-b4, b2 is updated by assigning the value of b4 (step S12), and the processing unit 7 returns to step S9.

Similarly, if b2 follows a2 in step S9, the processing unit 7 reads the next pair of transitions a3, a4 from the current line (step S13), and compares a3 with b2 (step S14). If a3 does not follow b2, indicating that segment b1-b2 also joins horizontally with segment a3-a4, a2 is updated by assigning the value of a4 (step S15), and the processing unit 7 returns to step S9.

The process involving steps S9 to S15 continues until a2 and b2 are found equal in step S9, b3 is found to be less than a2 in step S11, or a3 is found to be less than b2 in step S14, indicating that there are no more horizontally joined segments to be added to the output segment. The processing unit 7 then compares a1 and b1, assigns the smaller of a1 and b1 to a variable a1', assigns the larger of a2 and b2 to another variable a2' (step S16), outputs a1' and a2' as the next pair of transitions in the new line (step S17), and updates a0 by assigning the value of a2' (step S18).

Following step S6, S8, or S18, the processing unit 7 tests the value of a0 (step S19). If a0 has the end-of-line value, the process ends. Otherwise, the processing unit 7 returns to step S2 to read the next pairs of transitions following position a0.

By comparing the transition data of the current input line and the preceding input line, and thereby detecting black segments in the two lines that join horizontally when the two lines are combined, the process in FIG. 9 generates transition data for a new line that represents the bit-wise logical OR of the two lines, without having to expand the transition data of the current and preceding lines into bit-mapped data or actually perform logical operations on the bit-mapped data.

As a variation of the first embodiment, the same types of comparisons can be carried out in a group of three or more consecutive lines to detect black segments that join horizontally when the lines are combined to form a new line. The line density can thereby be reduced by a factor of three or more.

The transition data generated by the first embodiment can also be used for various image-processing purposes other than line-density conversion. One purpose is the elimination of dot noise by the detection of isolated dots. For example, a pair of transitions output in step S5 or S7 in FIG. 9 can be treated as noise if the segment length (the difference between a1 and a2 in step S7, or between b1 and b2 in step S5) is less than two dots, or less than some other suitable length threshold. Noise transitions found in this way can be removed from the transition data of the input image, to clean up the input image. If the line density of the input image is converted, such noise transitions can of course be omitted from the output image data.

In another example of dot-noise removal, isolated segments in the middle dot line in group of three consecutive dot lines are detected, and eliminated if their length is less than a threshold length.

Next, a second embodiment will be described. The second embodiment doubles the line density of bi-level image data by interpolating new lines.

Figure 10:
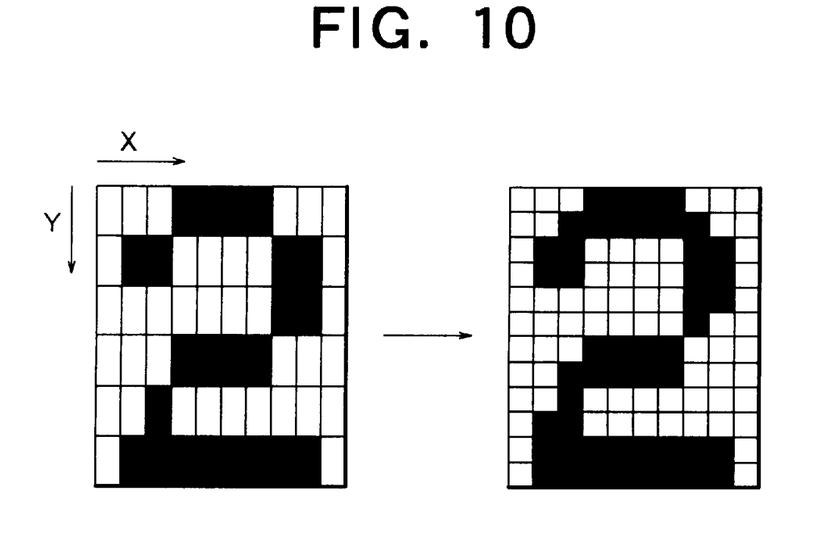
FIG. 10 shows input and output images illustrating line-density conversion in a second embodiment of the invention.
Figure 11:
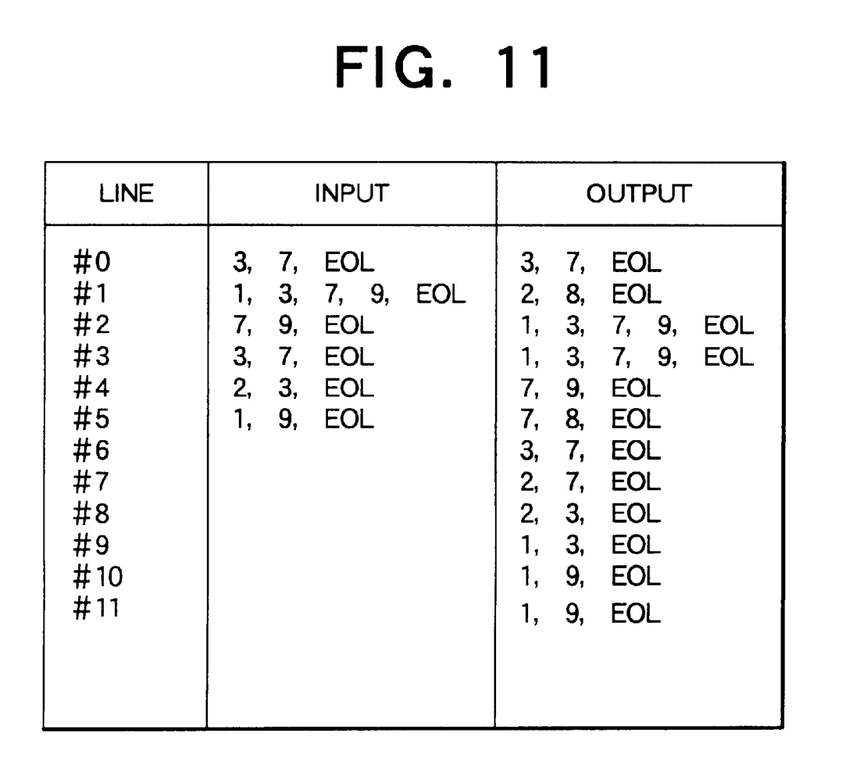
FIG. 11 shows the transition data of the images in FIG. 10.

FIG. 10 shows an example of a bi-level image before and after doubling of the line density. FIG. 11 lists the transition data of the input and output images. Output line #0 is identical to input line #0. Output line #1 is obtained from input lines #0 and #1. Output line #2 is identical to input line #2. Output line #3 is obtained from input lines #2 and #3.

The operation of the second embodiment will be described with reference to FIGS. 12 to 17. In FIGS. 12 to 16, lines #0, #1, and #2 are three consecutive input lines. Line #0.5 is an output line interpolated between lines #0 and #1. Line #1.5 is an output line interpolated between lines #1 and #2. Line #1 is the current line. The symbols a0, a1, a2, b1, and b2 have the same meaning as in the first embodiment.

Figure 12:
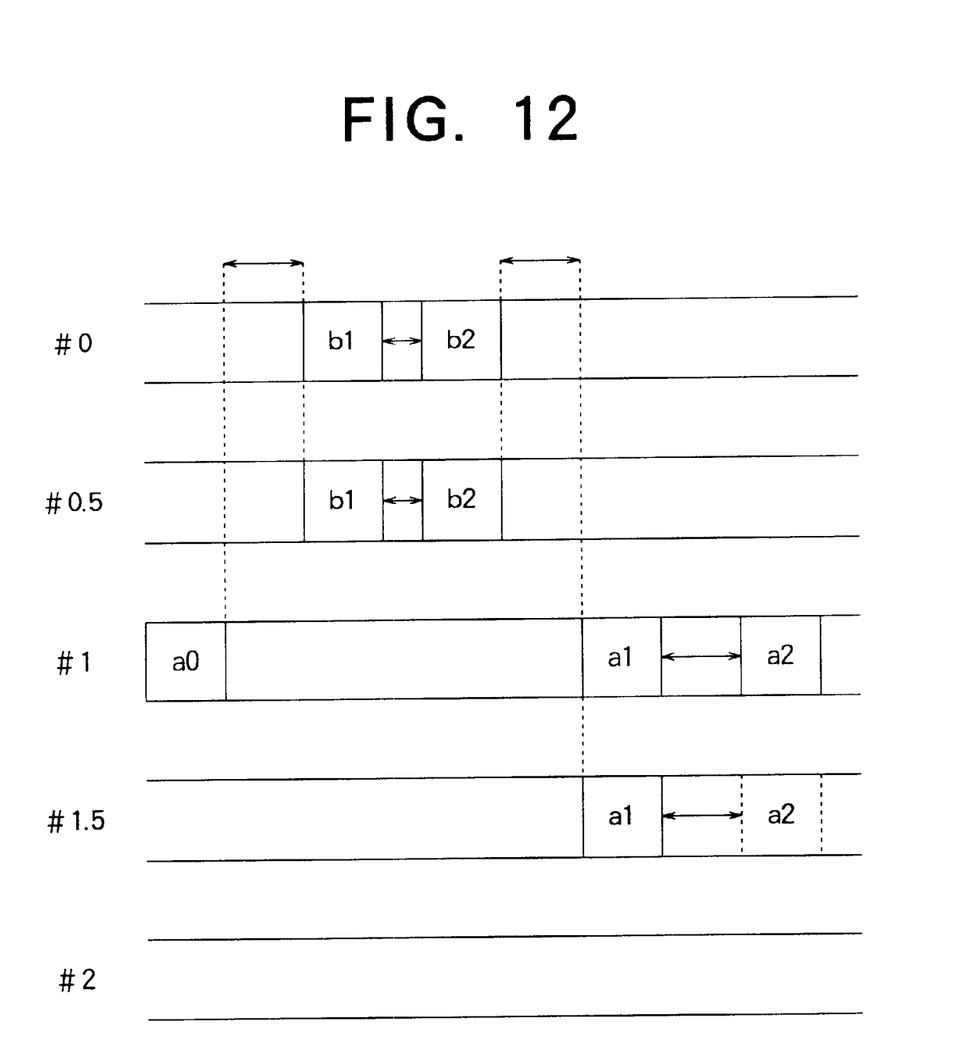
FIG. 12 illustrates the processing of horizontally isolated segments in the first embodiment.

FIG. 12 illustrates the case of isolated black segments b1-b2 and a1-a2. Each of these isolated segments is output in the next interpolated line, b1-b2 in line #0.5 and a1-a2 in line #1.5. Segment a1-a2 in input line #1 is not output in the preceding interpolated line #0.5; the processing in the second embodiment differs in this regard from the processing in the first embodiment.

Figure 13:
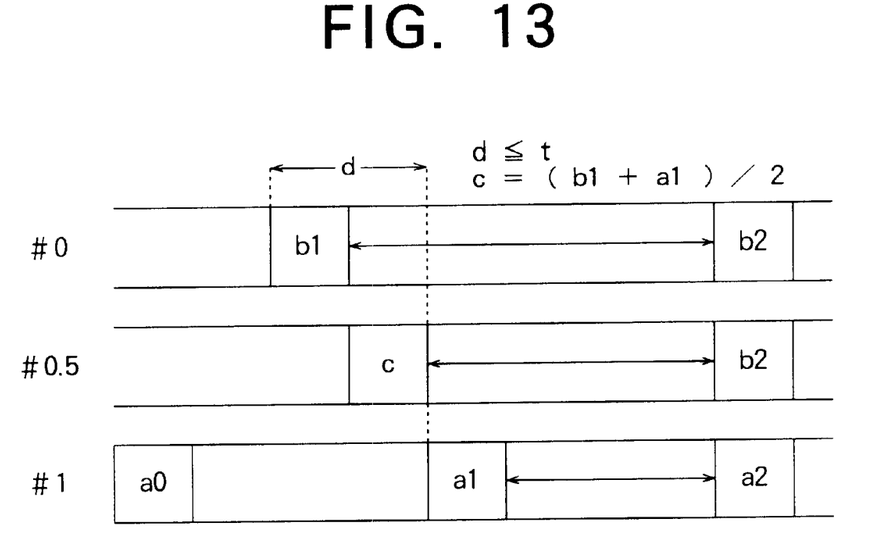
FIGS. 13 and 14 illustrate the processing of horizontally joined segments with approximately equal transition positions.

FIG. 13 shows an example of horizontally joining segments a1-a2 and b1-b2 with starting transitions (a1, b1) differing by an amount (d) not exceeding a predetermined difference threshold (t). The segment output in the interpolated line starts at a position (c) intermediate between positions a1 and b1. This position (c) may be calculated as the arithmetic mean of a1 and b1 (as indicated by the equation in the drawing), or in another suitable way.

Figure 14:
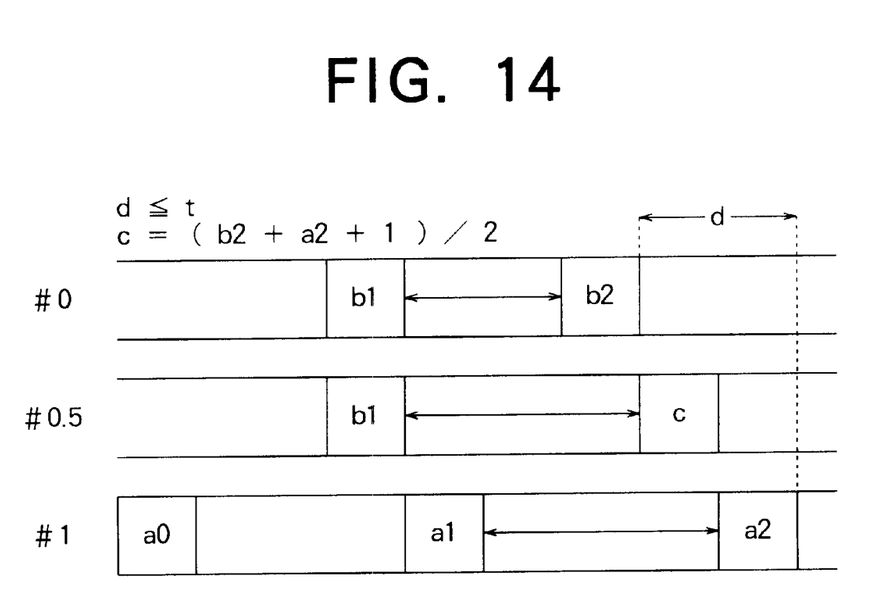

FIG. 14 shows an example of horizontally joining segments a1-a2 and b1-b2, with ending transitions (a2, b2) differing by an amount (d) not exceeding the predetermined difference threshold (t). The segment output in the interpolated line ends at a position (c) intermediate between positions a2 and b2, calculated as the arithmetic mean of a1 and b1, or in another suitable way. For symmetry in rounding off, the arithmetic mean can be calculated as half the sum of a1, b1, and one, as shown.

The use of intermediate starting and ending points in the interpolated lines in FIGS. 13 and 14 helps to create smooth outline contours in the output image. When the starting points of the segments in the current line and preceding line are widely separated, however, there are many cases in which the use of an intermediate starting point in the interpolated line would be meaningless. Similarly, an intermediate ending point in the interpolated line may be meaningless when the ending points in the lines above and below are widely separated.

Figure 15:
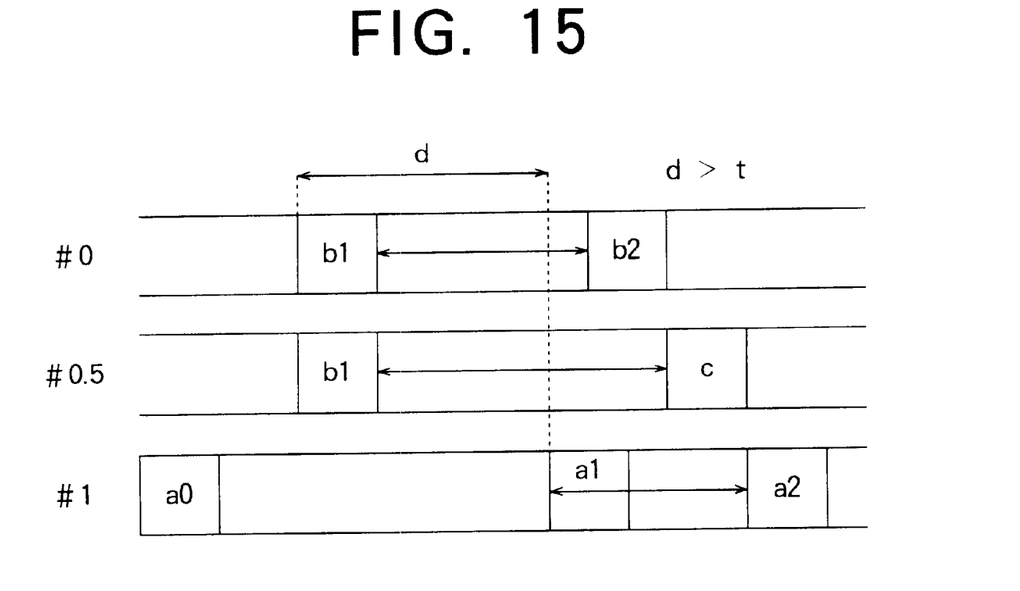
FIGS. 15 and 16 illustrate the processing of horizontally joined segments with widely separated transition positions.

FIG. 15 accordingly shows an example of horizontally joining segments a1-a2 and b1-b2 with starting transitions (a1, b1) differing by more than the predetermined threshold distance (t). The segment output in the interpolated line #0.5 starts at the same position b1 as the segment in the preceding line #0.

Figure 16:
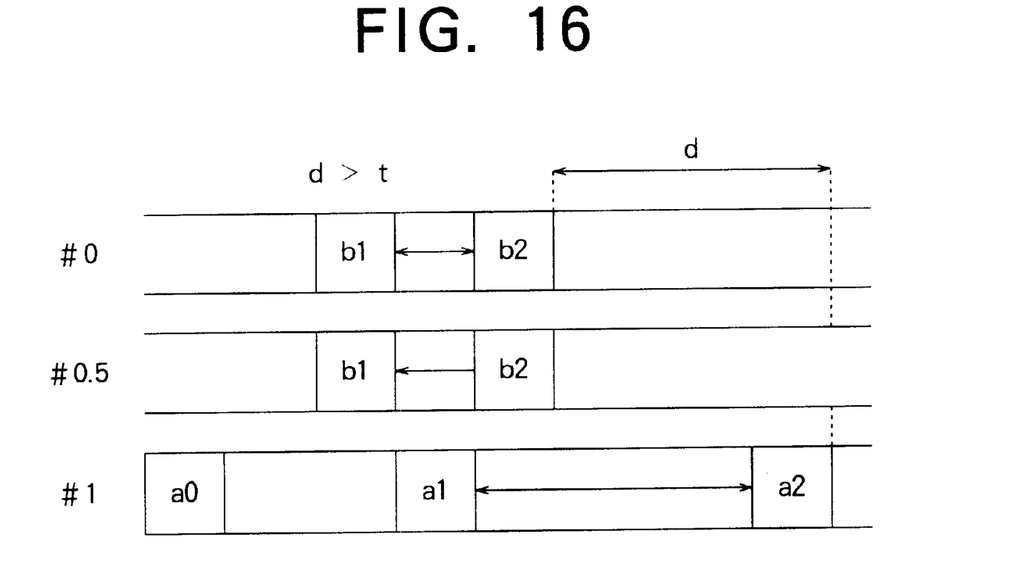

FIG. 16 shows an example of horizontally joining segments a1-a2 and b1-b2 with ending transitions (a2, b2) differing by more than the predetermined threshold distance (t). The segment output in the interpolated line #0.5 ends at the same position b2 as the segment in the preceding line.

As FIGS. 12 to 16 illustrate, the second embodiment creates an interpolated dot line by copying segments from the preceding input dot line, but adjusts the starting and ending positions of the copied segments if they are close to the starting and ending positions of joining segments in the current line.

Figure 17:
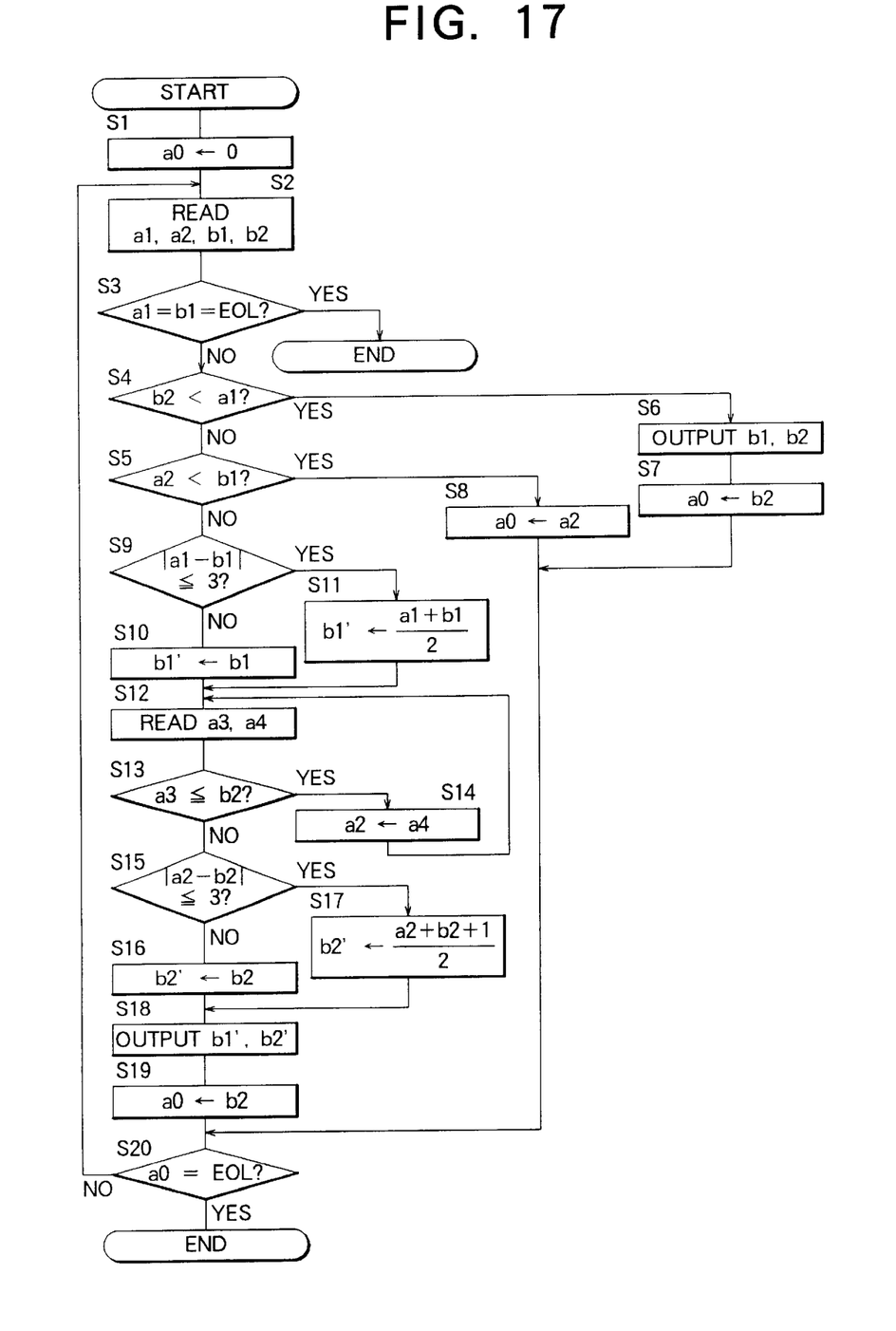
FIG. 17 is a flowchart illustrating the operation of the second embodiment.

FIG. 17 illustrates the process performed by the processing unit 7 in the second embodiment. Steps S1 and S2 initialize a0 and read a1, a2, b1, and b2, as in the first embodiment. The processing unit 7 then checks a1 and b1 (step S3), and terminates the interpolation process if a1 and b1 are both end-of-line codes.

As in the first embodiment, b2 is compared with a1 (step S4) and a2 with b1 (step S5), and transitions b1 and b2 are output on the interpolated line (step S6) if b2 is less than a1. If a2 is less than b1, however, transitions a1 and a2 are not output; that is, an interpolated line receives isolated segments from the preceding input line but not from the following input line, as was illustrated in FIG. 12. The variable a0 is updated to b2 (step S7) if b2 is less than a1, and to a2 (step S8) if a2 is less than b1.

If segments a1-a2 and b1-b2 join horizontally, the processing unit 7 compares the absolute value of the difference between a1 and b1 with a threshold value (step S9). The threshold value is shown for illustrative purposes as being equal to three. If the difference between a1 and b1 exceeds this threshold, the value of b1 is assigned to a variable b1' (step S10). If the difference between a1 and b1 does not exceed the threshold, b1' is set equal to the arithmetic mean of a1 and b1 (step S11).

After step S10 or S11, the processing unit 7 reads the next pair of transitions a3, a4 in the current line (step S12), and compares a3 with b2 (step S13). If a3 is equal to or less than b2, indicating that segment b1-b2 also joins horizontally with segment a3-a4, the processing unit 7 updates a2 to the value of a4 (step S14), and returns to step S11. The loop comprising steps S12, S13, and S14 is repeated until the processing unit 7 has found the last segment in the current line joining horizontally with segment b1-b2 in the preceding line. Upon exit from this loop to step S15, a1 is the starting transition of the first segment in the current line joining with segment b1-b2 in the preceding line, and a2 is the ending transition of the last segment in the current line joining with segment b1-b2 in the preceding line.

In step S15, the processing unit 7 compares the absolute value of the difference between a2 and b2 with the above-mentioned threshold value (three). If the difference between a2 and b2 exceeds this threshold, the value of b2 is assigned to a variable b2' (step S16). If the difference between a1 and b1 does not exceed the threshold, b2' is set equal to the arithmetic mean of a2 and b2 plus one (step S17).

The values of b1' and b2' are now output as the transitions of a segment in the interpolated line (step S18), and a0 is updated to the value of b2 (step S19). Following step S7, S8, or S19, the value of a0 is tested (step S20). The process ends if a0 is now an end-of-line code. Otherwise, the process returns to step S2 to read the next pairs of segments located to the right of a0 in the current and preceding lines.

The first embodiment described above can be used, for example, in transmitting a stored image with a line density of 15.4 lines per millimeter to a facsimile machine that can only print images with line densities up to 7.7 lines per millimeter. The second embodiment can be used to transmit a stored image with a line density of 3.85 lines per millimeter to a facsimile machine that prints 7.7 lines per millimeter. These embodiments can also be used to process bi-level image data that will be supplied to a printer, or bi-level image data received from a scanner, and in various other image-processing situations.

The second embodiment can be used to improve the appearance of a bi-level image without converting its line density. For example, image contours can be smoothed by output of the interpolated lines, without output of the input lines of the image.

More generally, contours can be improved by examining groups of an appropriate number of consecutive dot lines, detecting horizontally joined black segments, and modifying the transition positions of the joined segments so as to reduce small-scale random variations in the transition positions.

Figure 18:
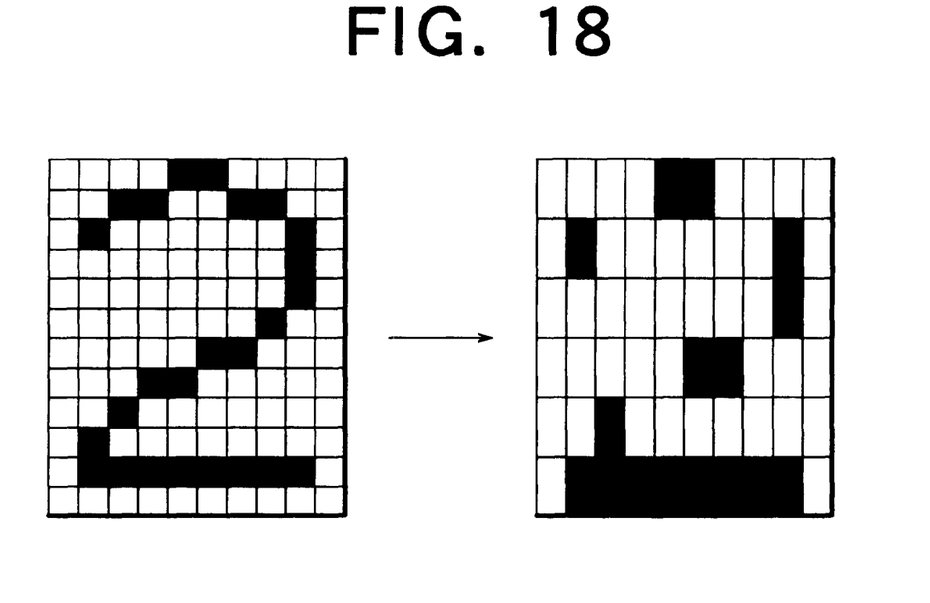
FIG. 18 illustrates line-density reduction by the discarding of dot lines.
Figure 19:
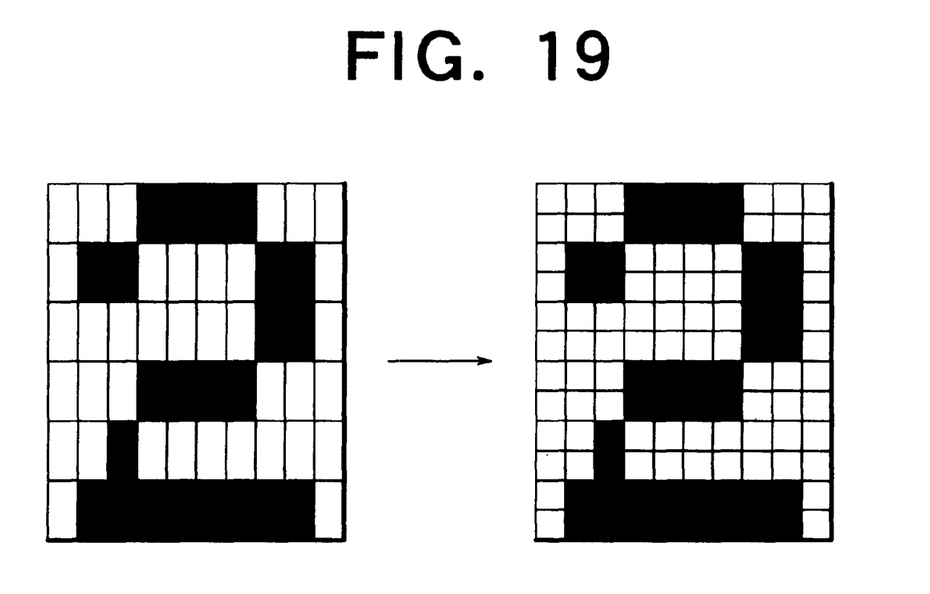
FIG. 19 illustrates interpolation by copying dot lines.

For comparison of the present invention with the simple methods of line-density conversion used in the prior art, FIG. 18 shows an example of line-density conversion in which the line density is halved by discarding every second line. The quality of the output image is greatly inferior to the quality achieved by the first embodiment in FIG. 3. FIG. 19 shows an example in which the line density is doubled by output of two copies of every input line. The jagged appearance due to the low vertical resolution of the input image is reproduced in the output image, which is inferior in quality to the smoother image produced by the second embodiment in FIG. 10.

Figure 20:
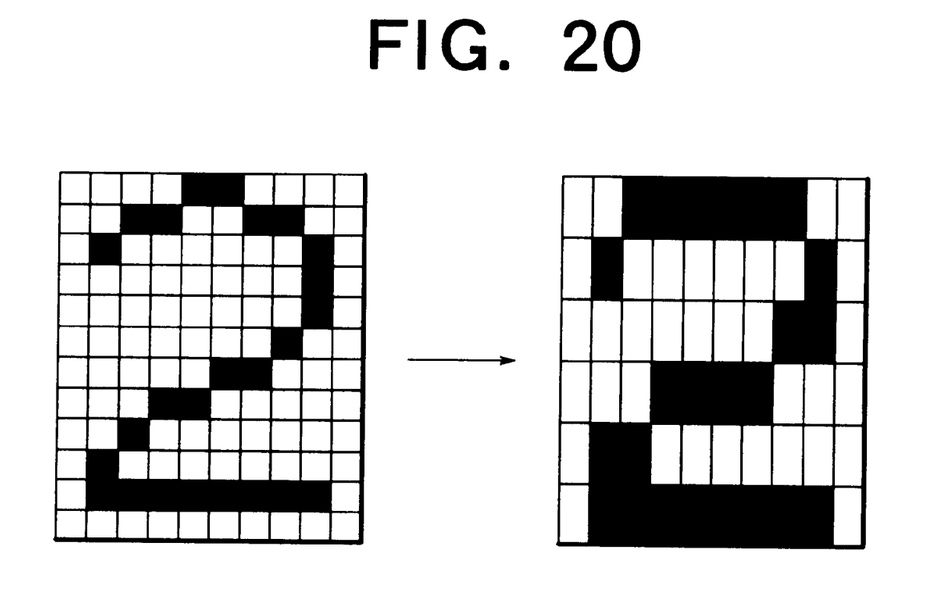
FIG. 20 illustrates line-density reduction by bit-wise logical OR operations.
Figure 21:
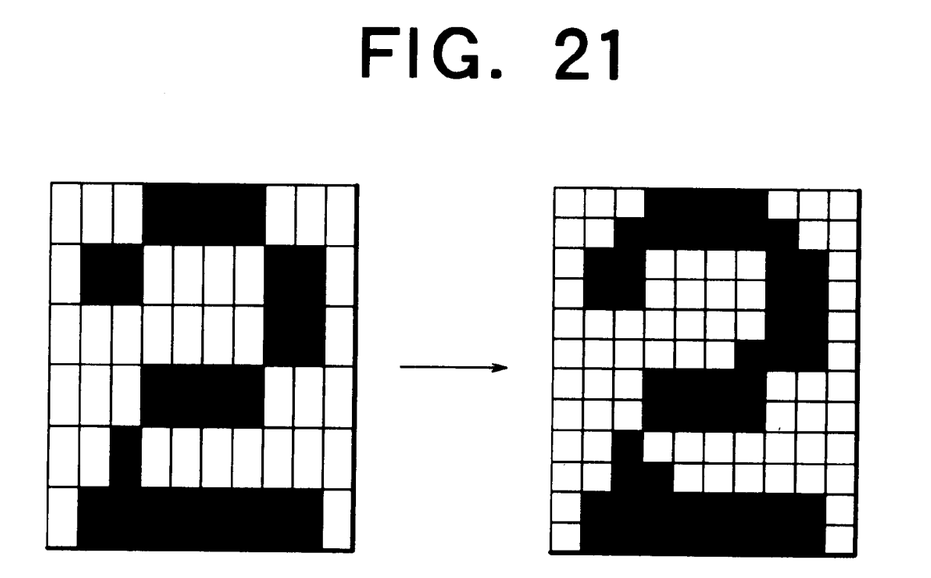
FIG. 21 illustrates interpolation by a conventional bit-wise comparison process.

For comparison with more complex methods of line-density conversion, FIG. 20 shows the same input image as in the first embodiment converted by a bit-wise logical OR operation performed on the bit-mapped data in adjacent lines. The output image is identical to the output image in FIG. 3 in the first embodiment; the first embodiment achieves the same result without requiring bit-wise logical operations. FIG. 21 shows the same input image as in the second embodiment converted by a conventional interpolation process making bit-wise comparisons. The quality of the output image is comparable to the quality achieved by the second embodiment in FIG. 10, but much more processing is required than in the second embodiment.

A few variations in the embodiments have been mentioned above, but those skilled in the art will recognize that further variations are possible within the scope claimed below.

What is claimed is:

1. A method of analyzing a bi-level image having a first level and a second level, said bi-level image being coded as transition data indicating positions of transitions between the first level and the second level in dot lines oriented in a first direction, comprising the steps of:

(a) reading, from said transition data, the transition positions in a consecutive group of said dot lines;

(b) comparing the transition positions in different dot lines in said consecutive group; and (c) detecting segments, in the different dot lines in said consecutive group, that have said first level and join mutually in said first direction, wherein:

said step (a) further comprises the steps of
reading a position a1 of a transition to said first level in a first dot line in said consecutive group,
reading the position a2 of a first transition to said second level following said position a1 in said first dot line, said position a1 and said position a2 defining a first segment having said first level,
reading a position b1 of a transition to said first level in a second dot line in said consecutive group, and
reading the position b2 of a first transition to said second level following said position b1 in said second dot line, said position b1 and said position b2 defining a second segment having said first level;

said step (b) further comprises the steps of
comparing said position a1 and said position b2, and
comparing said position a2 and said position b1; and in said step (c), said first segment and said second segment are treated as mutually joining if said position a1 does not follow said position b2 in said first direction, and said position b1 does not follow said position a2 in said first direction.

2. A method of analyzing a bi-level image having a first level and a second level, said bi-level image being coded as transition data indicating positions of transitions between the first level and the second level in dot lines oriented in a first direction, comprising the steps of:
   (a) reading, from said transition data, the transition positions in a consecutive group of said dot lines;
   (b) comparing the transition positions in different dot lines in said consecutive group;
   (c) detecting segments, in the different dot lines in said consecutive group, that have said first level and join mutually in said first direction, and
   (d) detecting isolated segments having said first level in one dot line in said consecutive group, each of said isolated segments not being joined in said first direction to any other segments having said first level in any other dot lines in said consecutive group.

3. A method of removing dot noise from a bi-level image having a first level and a second level, said bi-level image being coded as transition data indicating positions of transitions between the first level and the second level in dot lines oriented in a first direction, comprising the steps of:
   (a) analyzing the bi-level image by
      (i) reading, from said transition data, the transition positions in a consecutive group of said dot lines;
      (ii) comparing the transition positions in different dot lines in said consecutive group;
      (iii) detecting segments, in the different dot lines in said consecutive group, that have said first level and join mutually in said first direction and
      (iv) detecting isolated segments having said first level in one dot line in said consecutive group, each of said isolated segments not being joined in said first direction to any other segments having said first level in any other dot lines in said consecutive group,
   thereby detecting isolated segments having said first level in each dot line in said bi-level image;
   (b) comparing lengths of the isolated segments detected in said step (a) with a threshold length; and
   (c) removing the transition positions of isolated segments with lengths less than said threshold length from said transition data.

4. A method of analyzing a bi-level image having a first level and a second level, said bi-level image being coded as transition data indicating positions of transitions between the first level and the second level in dot lines oriented in a first direction, comprising the steps of:
   (a) reading, from said transition data, the transition positions in a consecutive group of said dot lines;
   (b) comparing the transition positions in different dot lines in said consecutive group; and
   (c) detecting segments, in the different dot lines in said consecutive group, that have said first level and join mutually in said first direction,
   (d) comparing a difference between the positions of the transitions to said first level of a pair of mutually joined segments found in said step (c) with a difference threshold; and
   (e) comparing a difference between the positions of the transitions to said second level of said pair of mutually joined segments with said difference threshold.

5. A method of smoothing contours in a bi-level image having a first level and a second level, said bi-level image being coded as transition data indicating positions of transitions between the first level and the second level in dot lines oriented in a first direction, comprising the steps of:
   (a) analyzing said bi-level image, including by the steps of:
      (i) reading, from said transition data, the transition positions in a consecutive group of said dot lines;
      (ii) comparing the transition positions in different dot lines in said consecutive group; and
      (iii) detecting segments, in the different dot lines in said consecutive group, that have said first level and join mutually in said first direction;
      (iv) comparing a difference between the positions of the transitions to said first level of a pair of mutually joined segments found in said step (iii) with a difference threshold; and
      (v) comparing a difference between the positions of the transitions to said second level of said pair of mutually joined segments with said difference threshold;
   (b) adjusting the positions of the transitions to said first level of segments having said first level that are mutually joined in said first direction if the difference between said positions is found in said step (iv) to be less than said difference threshold; and
   (c) adjusting the positions of the transitions to said second level of segments having said first level that are mutually joined in said first direction if the difference between said positions is found in said step (v) to be less than said difference threshold.

6. A method of generating a new dot line from a bi-level image having a first level and a second level, said bi-level image being coded as transition data indicating positions of transitions between the first level and the second level in dot lines oriented in a first direction, comprising the steps of:
   (a) reading, from said transition data, the transition positions in a consecutive group of said dot lines;
   (b) comparing the transition positions in different dot lines in said consecutive group;
   (c) detecting segments, in the different dot lines in said consecutive group, that have said first level and join mutually in said first direction; and
   (d) generating transition data for said new dot line by copying the transition data read in said step (a), omitting interior transition positions of the mutually joining segments detected in said step (c).

7. The method of claim 6, wherein:
   said step (a) further comprises the steps of reading a position a1 of a transition to said first level in a first dot line in said consecutive group,
   reading the position a2 of a first transition to said second level following said position a1 in said first dot line, said position a1 and said position a2 thus defining a first segment having said first level,
   reading a position b1 of a transition to said first level in a second dot line in said consecutive group, and
   reading the position b2 of a first transition to said second level following said position b1 in said second dot line, said position b1 and said position b2 thus defining a first segment having said first level; said step (b) further comprises the steps of
   comparing said position a1 and said position b2, and comparing said position a2 and said position b1;
   in said step (c), said first segment and said second segment are treated as mutually joining if said position a1 does not follow said position b2 in said first direction, and said position b1 does not follow said position a2 in said first direction; and in said step (d),
said position a1 is treated as an interior transition position if said position a1 follows said position b1 but does not follow said position b2 in said first direction, and said position a2 is treated as an interior transition position if said position a2 precedes said position b2 but does not precede said position b1 in said first direction.

8. An image-processing apparatus for reducing line density in a bi-level image having a first level and a second level, said bi-level image being coded as transition data indicating positions of transitions between the first level and the second level in dot lines oriented in a first direction, comprising:

a pair of line buffers holding the transition data of two adjacent dot lines in said bi-level image; and a processing unit generating a new dot line from the transition data held in said pair of line buffers by the method of claim 6.

9. A method of interpolating a new dot line between a first dot line and a second dot line in a bi-level image having a first level and a second level, said bi-level image being coded as transition data indicating positions of transitions between the first level and the second level in a first direction, said first dot line and said second dot line being oriented in said first direction, comprising the steps of:

(a) reading, from said transition data, the transition positions of said first dot line and said second dot line;

(b) comparing the transition positions in said first dot line with the transition positions in said second dot line;

(c) detecting segments having said value in said first dot line that join in said first direction with at least one segment having said first value in said second dot line;

(d) for each segment B detected in said step (c), detecting a first joining segment A1 and a last joining segment A2 in said second dot line, said segment A1 and said segment A2 both having said first level, said segment B joining both said segment A1 and said segment A2 in said first direction, said segment B not joining any segment preceding said segment A1 in said first direction in said second dot line, said segment B not joining any segment following said segment A2 in said first direction in said second dot line; and (e) generating transition data for said new dot line by copying the transition data of said first dot line, adjusting the transitions positions of each segment B detected in said step (c) according to the transition positions of the first joining segment A1 and the last joining segment A2 detected in said step (d).

10. The method of claim 9, wherein for each segment B detected in said step (c), said step (e) further comprises the steps of:

(f) calculating a first difference between the positions of the transitions to said first level of said segment B and said first joining segment A1;

(g) comparing said first difference with a difference threshold;

(h) selecting a first new transition position intermediate between the positions of the transitions to said first level of said segment B and said first joining segment A1 if said first difference does not exceed said difference threshold, and equal to a position of a transition to said first level of said segment B if said first difference exceeds said difference threshold;

(i) calculating a second difference between the positions of the transitions to said second level of said segment B and said last joining segment A2;

(j) comparing said second difference with said difference threshold;

(k) selecting a second new transition position intermediate between the positions of the transitions to said second level of said segment B and said last joining segment A2 if said second difference does not exceed said difference threshold, and equal to a position of a transition to said second level of said segment B if said second difference exceeds said difference threshold; and (l) placing said first new transition position and said second new transition position in the transition data generated for said new dot line.

11. An image-processing apparatus for increasing line density in a bi-level image having a first level and a second level by interpolating dot lines, said bi-level image being coded as transition data indicating positions of transitions between the first level and the second level in dot lines oriented in a first direction, comprising:

a pair of line buffers holding the transition data of two adjacent dot lines in said bi-level image; and a processing unit generating a new dot line from the transition data held in said pair of line buffers by the method of claim 9.

* * * * *